US006688321B2

(12) United States Patent
Palmer

(10) Patent No.: US 6,688,321 B2
(45) Date of Patent: Feb. 10, 2004

(54) METHOD AND APPARATUS FOR A FLOW REGULATOR HAVING AN INTEGRAL HINGE

(76) Inventor: David W. Palmer, 200 Berkeley Rd., North Andover, MA (US) 01845

(*) Notice: Subject to any disclaimer, the term of this patent is extended or adjusted under 35 U.S.C. 154(b) by 23 days.

(21) Appl. No.: 09/993,111

(22) Filed: Nov. 6, 2001

(65) Prior Publication Data

US 2002/0108652 A1 Aug. 15, 2002

Related U.S. Application Data

(60) Provisional application No. 60/246,205, filed on Nov. 6, 2000.

(51) Int. Cl.[7] .................................................. G05D 7/00

(52) U.S. Cl. ................................ 137/15.19; 137/15.23; 137/315.16; 137/503; 137/625.3

(58) Field of Search ................................. 137/501, 503, 137/504, 625.3, 15.19, 15.23, 315.16

(56) References Cited

U.S. PATENT DOCUMENTS

| | | | | |
|---|---|---|---|---|
| 562,131 | A | 6/1896 | Gordon | |
| 2,192,042 | A | 2/1940 | Hoffmann | |
| 2,803,261 | A | 8/1957 | Carlson | |
| 2,868,225 | A | 1/1959 | Wigham et al. | |
| 2,899,973 | A | 8/1959 | Carlson | |
| 2,918,933 | A | 12/1959 | Boitnott | |
| 3,053,272 | A | 9/1962 | Babson | |
| 3,138,174 | A | 6/1964 | Gilpin | |
| 3,237,616 | A | 3/1966 | Daieh et al. | |
| 3,312,241 | A | 4/1967 | Bryant | |
| 3,422,843 | A | 1/1969 | Blackman et al. | |
| 3,605,788 | A | 9/1971 | Brown | |
| 3,741,476 | A | 6/1973 | Travaglio | 236/87 |
| 3,766,933 | A | 10/1973 | Nicholson | 137/116.3 |
| 3,806,027 | A | 4/1974 | Ginne et al. | 236/49 |

(List continued on next page.)

FOREIGN PATENT DOCUMENTS

| | | |
|---|---|---|
| CH | 551043 | 5/1974 |
| DE | 532356 | 8/1931 |
| DE | 2216498 | 8/1974 |
| DE | 2309918 | 11/1976 |
| DE | 2389933 | 12/1978 |
| EP | 0068917 | 1/1983 |
| FR | 2349170 | 11/1977 |
| GB | 957118 | 5/1964 |
| GB | 2007335 | 5/1979 |

*Primary Examiner*—Stephen M. Hepperle
(74) *Attorney, Agent, or Firm*—Perman & Green, LLP; Rich Pickreign

(57) ABSTRACT

A device for regulating the flow of gas from an environment. The device includes a shell forming a path through which fluid flows. A fixed grate is disposed in the path so that as fluid flows in the path the fixed grate does not move. A movable grate assembly includes one or more plates and a movable grate attached to the one or more plates. The one or more plates includes an integral hinge such that the plate can rotate about the integral hinge. When the movable grate moves with respect to the fixed grate the impedance on the flow varies.

62 Claims, 11 Drawing Sheets

U.S. PATENT DOCUMENTS 3,820,556 A 6/1974 Millar et al. ................ 137/220
3,825,032 A 7/1974 Peruglia ..................... 137/496
3,833,989 A * 9/1974 McCabe .................. 29/890.14
3,853,143 A 12/1974 De Lepeleire .............. 137/494
3,862,644 A 1/1975 Emmons ..................... 137/486
3,900,045 A 8/1975 Murrell ................. 137/505.38
3,978,883 A 9/1976 Petersen et al. ......... 137/489.5
4,039,124 A 8/1977 Ginn et al. ................. 236/1 B
4,092,998 A 6/1978 Taplin ........................ 137/471
4,194,526 A 3/1980 Stromberg .................. 137/498
4,250,914 A 2/1981 Ferrentino .................. 137/501
4,250,915 A 2/1981 Rikuta ........................ 137/501
4,508,140 A 4/1985 Harrison ..................... 137/501
4,592,385 A 6/1986 Semon .................. 137/505.13
4,732,190 A 3/1988 Polselli ....................... 137/460
4,739,924 A 4/1988 Kelly .......................... 236/49
4,791,956 A 12/1988 Kominami et al. ......... 137/503
4,873,873 A 10/1989 Day ........................ 73/861.63
4,942,921 A 7/1990 Haessig et al. ............... 165/16
5,000,221 A 3/1991 Palmer .................. 137/505.38
5,005,636 A 4/1991 Haessig ....................... 165/16
5,251,654 A 10/1993 Palmer ....................... 137/501
5,320,124 A 6/1994 Palmer ....................... 137/501
5,460,172 A * 10/1995 Eckerbom et al. ..... 128/201.13
5,597,011 A 1/1997 Palmer ....................... 137/497
5,687,760 A 11/1997 Palmer ....................... 137/497

* cited by examiner

METHOD AND APPARATUS FOR A FLOW REGULATOR HAVING AN INTEGRAL HINGE

PRIORITY

This application claims priority from U.S. provisional application serial No. 60/246,205, filed Nov. 6, 2000, entitled "Method and Apparatus for a Flow Regulator Having an Integral Hinge" and bearing attorney docket number 955/127, the disclosure of which is incorporated herein, in its entirety, by reference.

TECHNICAL FIELD AND BACKGROUND ART

The present invention generally relates to a device having integral hinges for regulating the flow of fluid, particularly a gas, through a device.

Flow regulators, and in particular, flow regulators dealing with heating, ventilating, and air conditioning (HVAC) systems and house and industrial exhaust systems, typically include components having pin in hole hinges. Embodiments of fluid regulators having pin in hole hinges are described in U.S. Pat. Nos. 5,251,654, 5,597,011, 5,320,124, and 5,687,760, each of these patents are incorporated by reference herein in their entirety. Such pin in hole hinges add to the number of components making up the regulator. This adds complexity and cost to the manufacturing process of the regulator. Additionally, pin in hole hinges are susceptible to dirt or dust, and may produce particles through their wear and tear, which may make the regulator unsuitable for sterile and clean environments, particularly in critical air flow applications in industries such as micro-electronics, medical research, pharmaceuticals, and biotechnology, as well as hospitals.

SUMMARY OF THE INVENTION

In a first embodiment of the invention there is provided a device for regulating the flow of gas from an environment. The device includes a shell forming a path through which fluid flows. A fixed grate is disposed in the path so that as fluid flows in the path the fixed grate does not move. A movable grate assembly includes one or more plates, which may be attached to the shell, and a movable grate attached to the one or more plates. The one or more plates includes an integral hinge such that the plate can rotate about the integral hinge, wherein, when the movable grate moves with respect to the fixed grate, the impedance to the flow varies. The movable grate may be attached to each plate via an integral hinge.

In accordance with another embodiment of the invention, a device for regulating fluid flow from an environment includes a conduit having walls defining a path through which fluid flows. An impeder for variably impeding the flow through the path is attached to the conduit. The impeder includes an integral hinge such that the impeder can rotate about the integral hinge. The impeder may include a fixed grate disposed in the path so that as fluid moves the fixed grate does not move, and a movable grate, wherein when the movable grate moves with respect to the fixed grate the impedance on the flow varies.

In accordance with yet another embodiment of the invention, a system is presented for regulating the flow of gas from an environment, through a region and to a lower pressure area, so as to maintain a constant differential pressure in the region with respect to the environment. The system includes a path through which gas passes from the region to the lower pressure area. A reference chamber is located adjacent the path. First and second plates are mounted at opposite sides of the path so that the two plates are substantially parallel to each other. The first plate has a first integral hinge so that the first plate can rotate at the first integral hinge, and the second plate has a second integral hinge so that the second plate can rotate at the second integral hinge. Both the first plate and the second plate have a conduit side, facing the path, and a reference-pressure side, the second plate's reference-pressure side being exposed to the environment's pressure, and the first plate's reference-pressure side being exposed to the reference chamber. A reference conduit connects the region directly to the reference chamber so that the pressure in the reference chamber is the same as the region's pressure. An impeder variably impedes the flow through the path based on the position of the plates.

In a related embodiment, the impeder includes a fixed grate disposed in the path so that it does not move with respect to the path, and a movable grate. The movable grate is coupled to the first plate via a third integral hinge at a point distal from the first integral hinge, and to the second plate via a fourth integral hinge at a point distal from the second integral hinge. The movable grate is disposed immediately adjacent to the fixed grate, so that as the movable grate moves with respect to the fixed grate the impedance on the flow varies.

In accordance with yet another embodiment of the invention, a system is presented for regulating fluid flow includes a path through which fluid passes. A plate has a first integral hinge so that the plate can rotate at the first integral hinge. The plate has a reference-pressure side that is exposed to a reference pressure. A fixed grate is disposed in the path so that it does not move with respect to the path. A movable grate is coupled to the plate via a second integral hinge at a point distal from the first integral hinge. The movable grate is disposed immediately adjacent to the fixed gate, so that the movable and fixed grates impart an impedance to the flow through the path, and so that, as the movable grate moves with respect to the fixed grate, the impedance on the flow varies.

In accordance with still another embodiment of the invention, a device for regulating the flow of fluid through a passageway includes a conduit having a wall defining the passageway through the device. A member has a top face, exposed to a reference pressure, and a bottom face forming a portion of the conduit wall. The member has a first integral hinge so that the member can rotate at the first integral hinge. A gate is attached to the member at a point distal from the first integral hinge. The gate extends into the passageway so as to variably impede fluid flowing through the passageway at a constriction point. The gate's impedance on the fluid flow varies as a function of the pressure differential across the member's top and bottom faces. The gate and the member are mounted so that each moves in a direction transverse to the direction of the fluid through the constriction point.

In accordance with a related embodiment of the invention, the gate includes a movable grate fixedly attached to the member so that it moves with the member. Additionally, the conduit includes a fixed grate fixedly attached to the conduit so that the fixed grate does not move with respect to the conduit. The fixed grate and movable grate are located adjacent to each other so as to define a plurality of constriction points, the size of each constriction point varying as the member moves.

In accordance with still another embodiment of the invention, a device for regulating the flow of fluid includes a conduit through which fluid flows. A member has a frontal face along which the entire face fluid in the conduit flows, and a distal face exposed to a reference pressure. The member has an integral hinge so that the member can rotate at the integral hinge. The device also includes impedance means for variably impeding flow through the conduit at one or more constriction points. The size of each constriction point varies as the member moves. The impedance means extends only part way into the passageway, so that a portion of the flow through the passageway bypasses the constriction point.

In accordance with a related embodiment of the invention, the impedance means includes a movable grate fixedly attached to the member so that it moves with the member. Additionally, the conduit includes a fixed grate fixedly attached to the conduit so that the fixed grate does not move with respect to the conduit. The fixed grate and movable grate are located adjacent each other and define the one or more constriction points, wherein the size of each constriction point varying as the member moves.

In accordance with yet another embodiment of the invention, a device for regulating fluid flow includes a shell, a fixed grate, and a movable grate. The shell, fixed grate and movable grate are each formed from a single sheet of folded material. The shell forms a path through which fluid flows. The fixed grate is disposed in the path so that as fluid moves the fixed grate does not move. The movable grate assembly includes a movable grate that moves with respect to the fixed grate so as to vary flow impedance.

In related embodiments of the invention, the movable grate assembly includes at least one member that includes an integral hinge, such that the member can rotate at the hinge. The integral hinge may be formed by one of injection molding, hot forging, and machining of oriented material.

In accordance with another embodiment of the invention, a method for constructing a device for regulating fluid flow includes folding a first sheet of material forming a shell. A second sheet of material is folded to form a fixed grate and a third sheet of material is folded to form a movable grate. The shell, fixed grate, and the movable grate are combined to form the device. In related embodiments, the method further comprises applying a sealent, using a using a welding process, or using ultrasonic welding to seal the device.

In accordance with embodiments related to the above described methods, systems and devices, the movable grate assembly, shell (or conduit), and/or the fixed grate may be each formed from a single sheet of folded material. The system or device may further include an adjustor for urging the plates to move in a direction that adjusts the impedance on the flow. The adjuster may include one of a spring, a weight, a DC electric motor, or a piston cylinder arrangement. The spring may be one of a compression spring or a torsional spring. The movable grate and the fixed grate, when aligned, may have a shape that is substantially symmetric fore and aft relative to the path. The shape may be elliptical.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In the present specification and the appended claims, the term "integral hinge" shall refer to a single piece of material having two segments that rotate with respect to each other substantially about a fixed point through deformation of the material. An integral hinge may also be described as a "living hinge."

Figure 1:
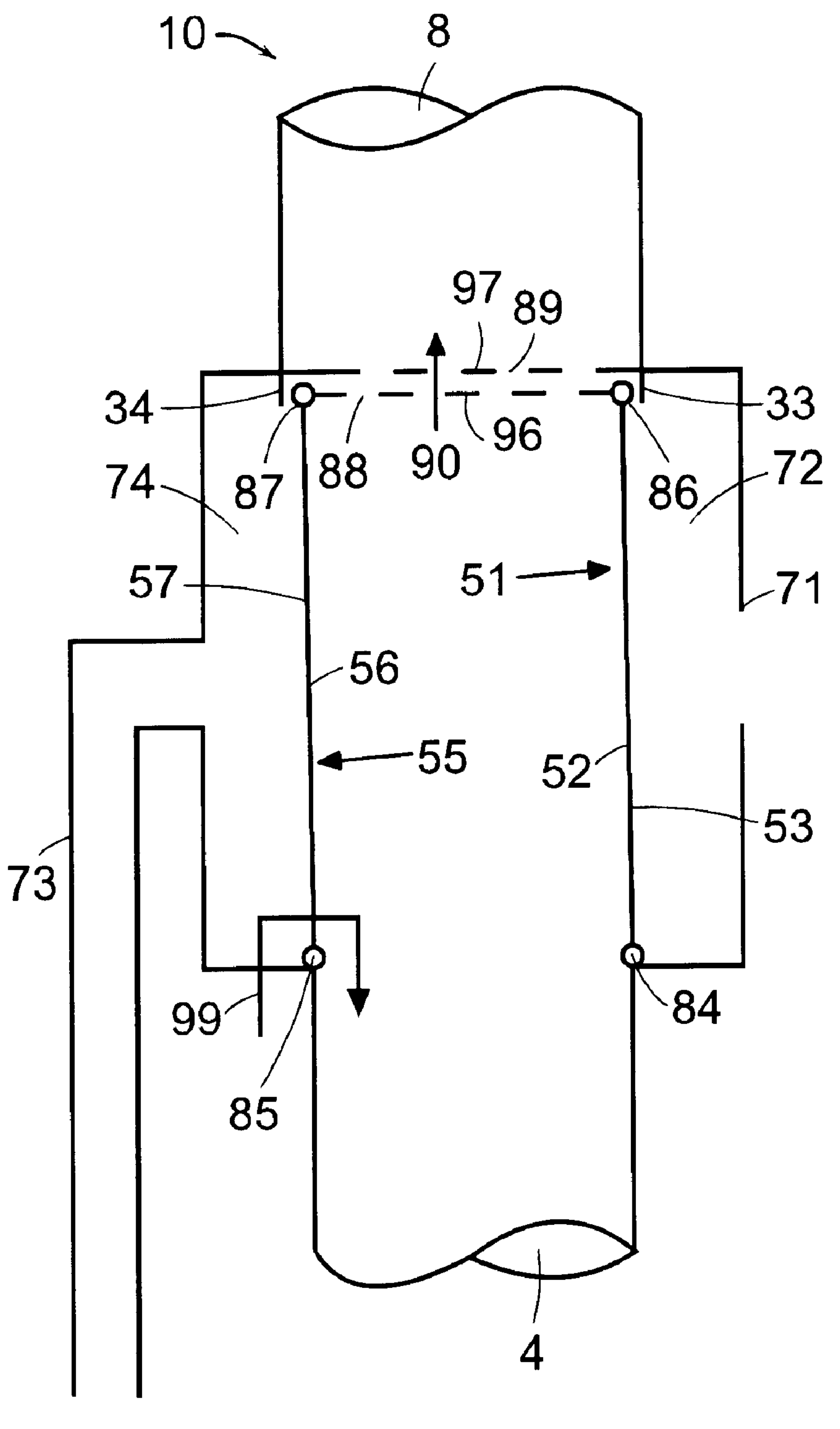
FIG. 1 shows a flow regulator that may be used to regulate the flow of fluid or gas in a conduit.

In accordance with one embodiment of the invention, FIG. 1 shows a diagram of a fluid regulator according to one embodiment of the present invention. The fluid regulator regulates the flow of fluid or gas in a conduit. The fluid regulator may be used, for example, where a precise constant pressure differential is desired with respect to a pressure reference. Additionally, the fluid regulator may be used in heating, ventilating, or air conditioning (HVAC).

A fluid conduit 10 allows fluid flow between openings 8 and 4. Two plates, 55 and 51, are located on opposite sides of the conduit 10. Both the plates, 51 and 55, and a movable grate 96 form an integrated component. The plates are integrally hinged at 84 and 85, and mounted to the conduit 10, so that the first plate 55 pivots about integral hinge 85, and the second plate 51 pivots about integral hinge 84. Additionally, the movable grate 96 is integrally hinged at 86 and 87 allowing the moving grate 96 to translate in a parallel manner through an arc, because the integrated plates rotate clockwise and counterclockwise about hinges 84 and 85. These three components, the two plates, 51, 55, and the moving grate 96 form substantially a parallelogram.

The fixed grate 97 is fixed across the flow in conduit 10, attached to the walls of the conduit and in close proximity to the movable grate. In various embodiments, this grate 97 is also a single component that is advantageously folded from a single sheet of material such as described below and shown in FIG. 4. The grates 96 and 97 provide an impedance to the flow through the device. When the grates are lined up with respect to each other so that apertures 88 and 89 of the two grates are aligned, the passageway 90 through the grates is at its widest, and the grates provide the least impedance to fluid flow. Alternately, when the apertures of the two grates, 88 and 89, are not aligned, impedance increases, reaching a maximum when the apertures do not overlap. The number and width of apertures on the fixed grate and adjustable grate are variable based on the intended use of the regulator and may be selected, for example, so as to keep the flow rate through the passageways above a desired level. A stop 33 or 34 may be utilized to inhibit movement of the movable grate 96. In one embodiment, a first stop is positioned so that the movable grate 96 can move in only one direction from position of least impedance (i.e., when the apertures of the two grates are fully aligned). The second stop is positioned so that the movable grate 96 moves in only one direction from position of greatest impedance (i.e. when the apertures of the two grates do not overlap).

Plate 55, is exposed to a pressure on surface 57 from reference chamber 74. Likewise, plate 51 is exposed to a pressure on surface 53 from reference chamber 72. While in some embodiments, the area of exposure from reference chamber 74 is equal to the area of exposure from reference chamber 74, in other embodiments these areas may be different by design. The difference in pressure between the two reference chambers 72 and 74 contribute in determining the position of the movable grate 96 relative to the fixed grate 97, since the plates 51 and 55 will pivot at 84 and 85 based on the differential pressure. In certain embodiments, an adjustable torque means 99 is applied, which is implemented by, but is not limited to, a spring, such as a compression spring, torsional spring, use of a weight, a DC electric motor, or the use of a piston and cylinder arrangement as may be found in a pneumatic or hydraulic control system. The torque means 99 may urge the plates, 55 and 51, to one of the extreme stops 33 or 34 in the absence of flow, establishing a set point in the presence of flow. The pressure in the conduit 10 between the plates 55 and 51 does not directly affect the position of the movable grate if the conduit-side faces, 56 and 52 have the same area, as the pressure acting on them is the same but in opposite directions. In such embodiments, the position of the integral unit having the plates 55 and 51 and movable grate 96 is thus determined by the pressure in the reference chambers, 74 and 72, the resulting force of the flow on the moving grate 96 itself, and the restoring torque 99. The set point is defined by that point upon which the above forces are in stable equilibrium.

It is to be appreciated that an embodiment with only one plate is possible. A guide may be mounted on the walls of the conduit to keep the movable grate in alignment and to keep the movable grate perpendicular to the flow through the conduit. The position of the movable grate in such a single-plate embodiment depends on the pressure differential across the lower plate, which is influenced by the Bernoulli effect caused by the fluid through the conduit.

Figure 2:
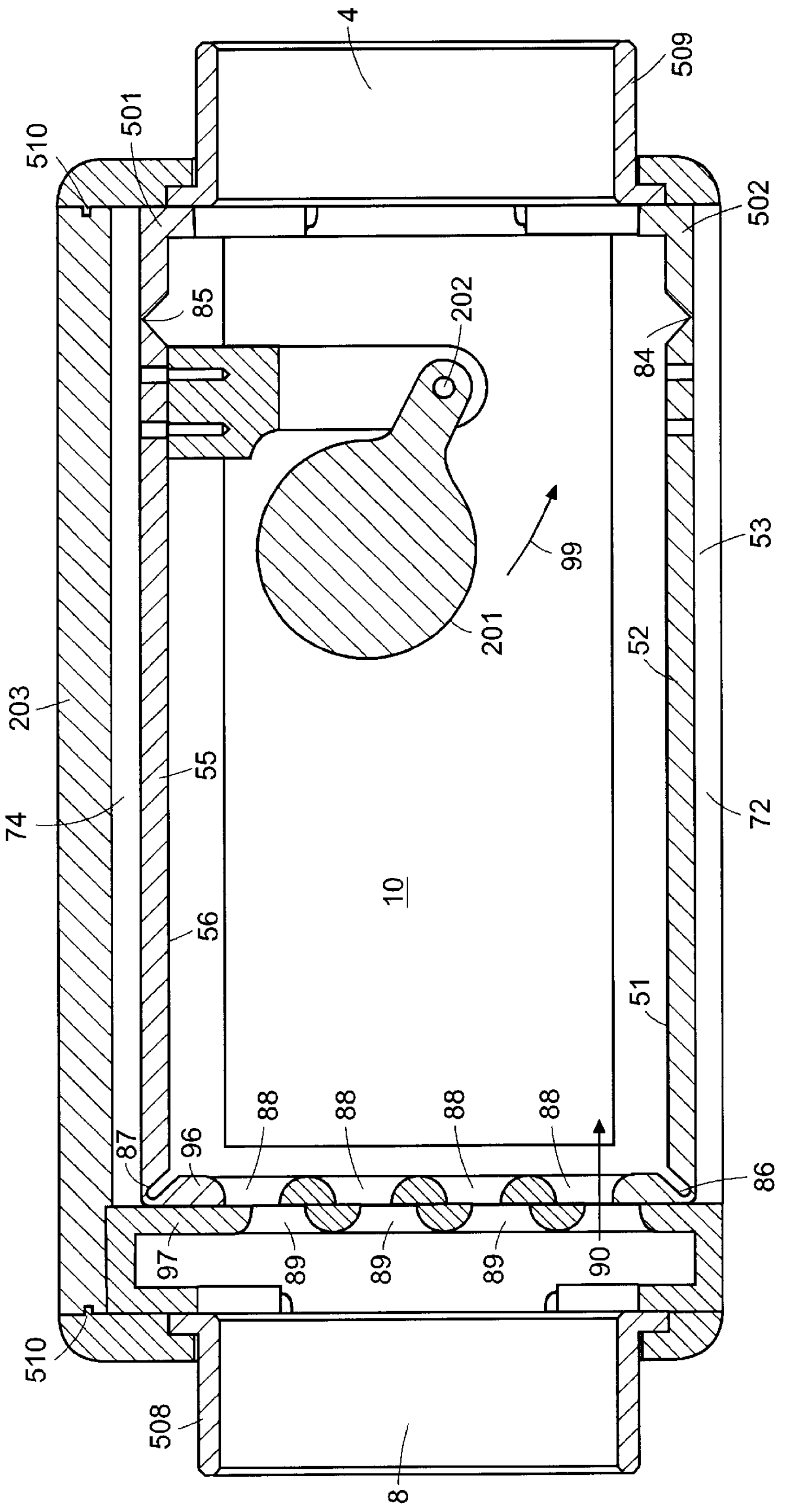
FIG. 2 shows a two-dimensional cross section of the fluid regulator.
Figure 3:
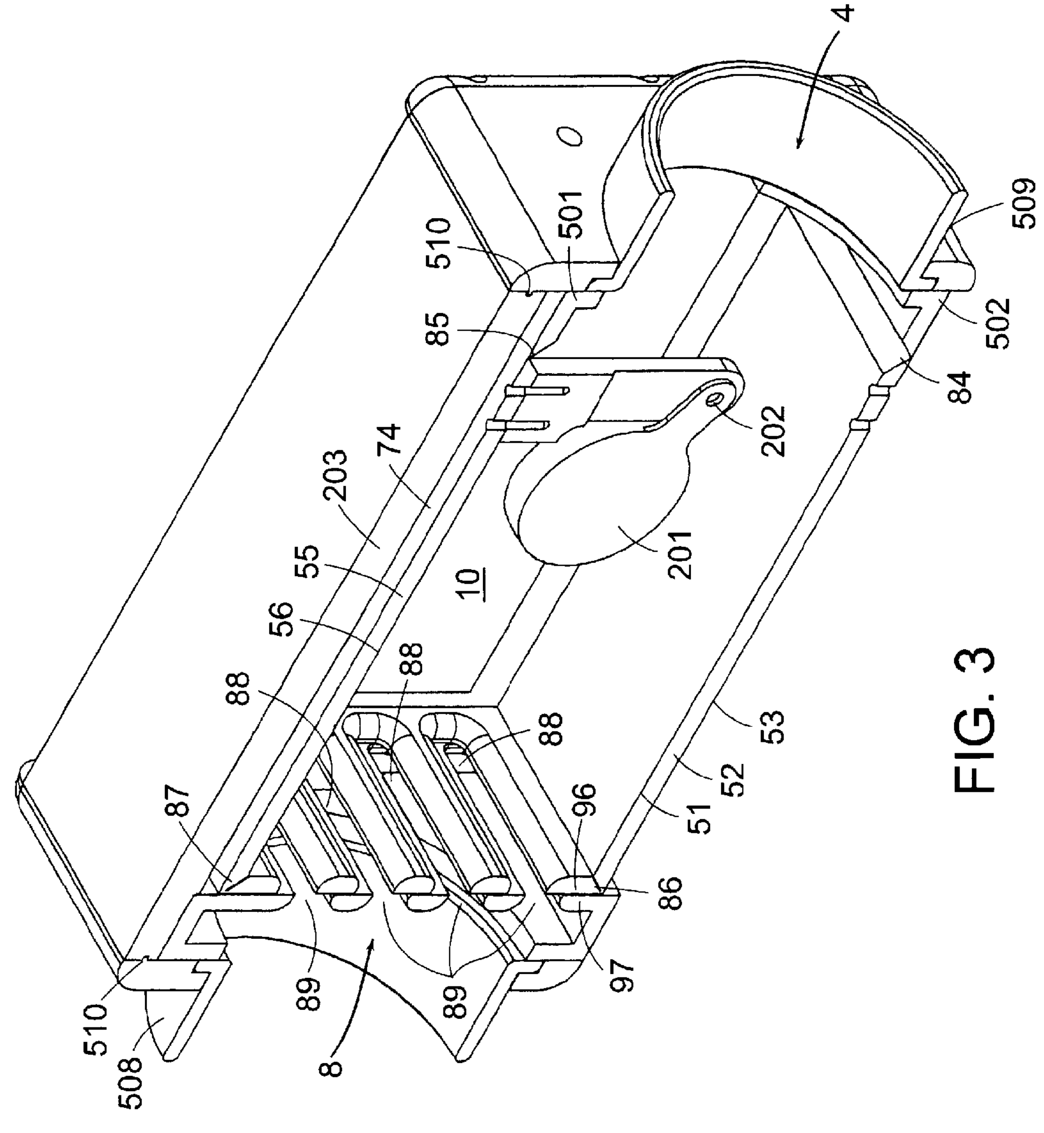
FIG. 3 shows a three-dimensional cross section of the fluid regulator shown in FIG. 2.

In FIG. 2, a two dimensional cross section of one embodiment of the subject invention is shown, while FIG. 3 shows a three dimensional cross section of the embodiment. The device is made up of three main parts, a fixed grate 97, a movable grate assembly having plates 52 and 55 and a movable grate 96, and the shell 203. Also shown is a balancing weight 201 for applying torque 99 to set the operation point. The torque 99 is adjustable and may be adjusted by varying the position of the weight with respect to pivot axis 202. In other embodiments, the placement and size of the weight may vary.

As described above, the pressure differential between reference chambers 72 and 74, and the torque caused from adjustable weight 201 determine the position of the movable grate assembly under operating conditions. Reference chamber 72 is exposed to the environment's pressure while, in this embodiment, chamber 74 has substantially the same pressure seen by plate wall 56, due to the allowed clearance between the shell 203 and the plate 55. Other embodiments may include, but are not limited to, having chamber 74 connected to a second reference pressure, as shown in FIG. 1. The plate 55 rotates about integral hinge 85, while plate 52 rotates about integral hinge 84. Integral hinges at 86 and 87 allow a degree of freedom to allow the translation through an arc. The hinges 86 and 87 are formed in such a way that when folded and implemented as shown, at maximum deflection there is no additional touching between plates 55, 52 with the movable grate 96. Depending on the movable grate's position 96 relative to the fixed grate 97, an impedance to fluid flow is achieved.

Figure 4C:
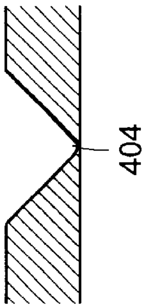
FIG. 4C shows an expanded view of a cut in the sheet of material of FIG. 4B.
Figure 4A:
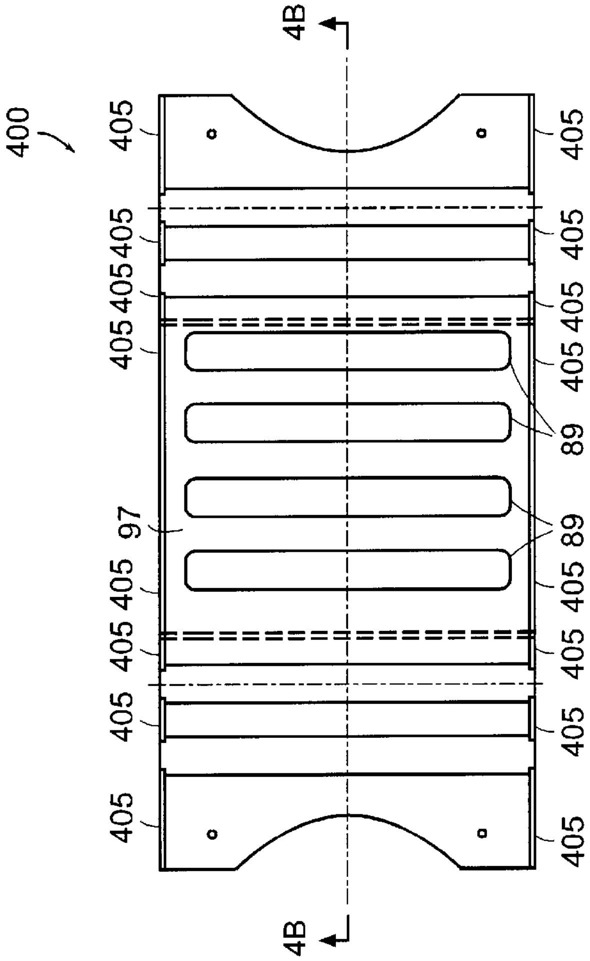
FIG. 4A shows a top-down layout for a single sheet of material that is folded to make a fixed grate for a flow regulator.
Figure 4B:
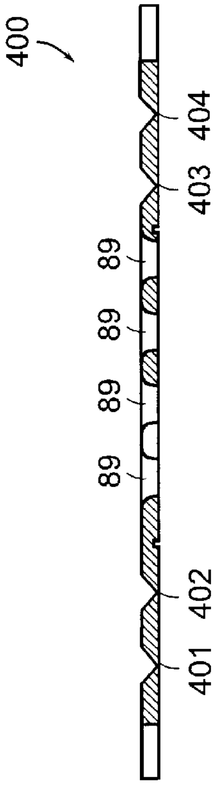
FIG. 4B shows a side view of the sheet of material in FIG. 4A across section A—A.

The fixed grate 97 is made by folding a single sheet of material 400, shown in FIGS. 4A and 4B. FIG. 4A shows a top-down layout of the sheet of material 400, while FIG. 4B shows a side view of material 400 across section A—A. Cuts are made into the material to form grooves 401, 402, 403, and 404 that facilitate one-time folding. An expanded view of groove 404 is shown in FIG. 4C. The two segments of material forming each of the grooves 401, 402, 403, and 404 are folded so as to form a 90 degree angle. Additionally, cuts in the plastic form apertures 89 in the fixed grate 97. The ends of the material are also shaped to accommodate openings 4 and 8 of conduit 10. Position tabs 405 are formed along the edges of the material 400 for assembly purposes as described below.

Figure 5A:
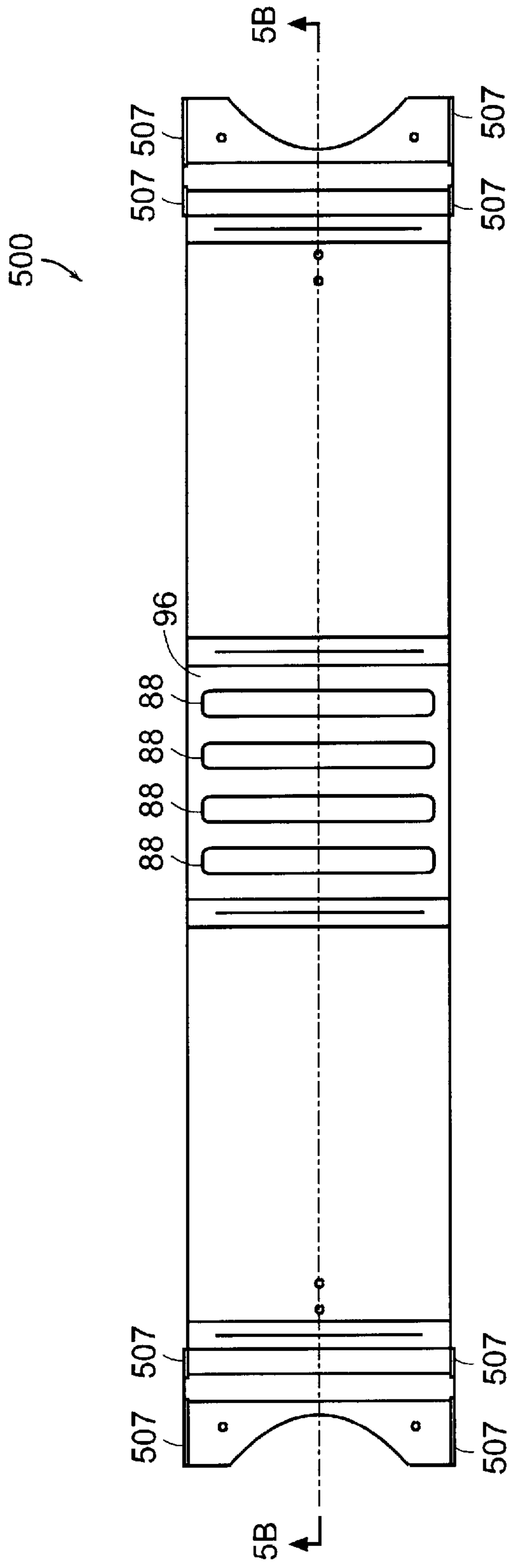
FIG. 5A shows a top-down layout for a single sheet of material that is folded to make a movable grate for a flow regulator.
Figure 5B:
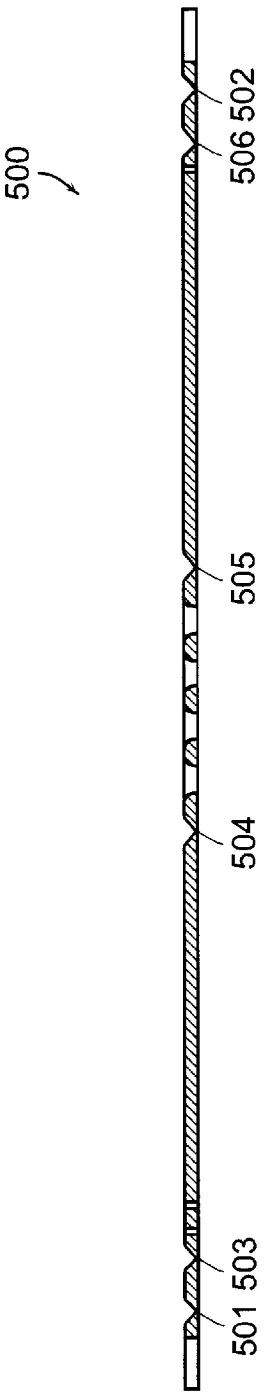
FIG. 5B shows a side view of the sheet of material in FIG. 5A across section A—A.

The movable grate assembly is also made of a single sheet of folded material 500, as shown in FIGS. 5A and 5B. FIG. 5A shows a top-down layout for material 500, while FIG. 5B shows a side view of material 500 across section A—A. Prior to folding, grooves 501 and 502 are formed in the material 500 to facilitate fabrication. These grooves 501 and 502 are meant for one time folding. The two segments of material forming each of the grooves 501 and 502 are folded so as to form a 90 degree angle. Additional grooves, 503, 504, 505, and 506 are formed in the material 500 to form the integral hinges capable of being bent multiple times. In some embodiments, these grooves 503, 504, 505, and 506 differ from grooves 501 and 502 in that the middle section of the integral hinge may be a void to relieve bending loads. In various embodiments, integral hinges may be formed by, but not limited to, injection molding, hot forging, and machining of an oriented material, such as a polymer. Among the preferred materials for construction of the flow regulator is high molecular weight polypropylene. Additional materials include, but are not limited to, elastomers, and other rubber-like materials. Apertures 88 are also formed in the movable grate 96.

In various embodiments, apertures 88 and 89 are approximately 50% of the cross sectional area of conduit 10 when fully aligned. This allows the regulator to shut off the flow when the apertures 88 and 89 are not overlapping.

In other embodiments, the apertures 88 on the fixed grate 97 may be smaller to accommodate lower flow rates without losing sensitivity (the smallest perturbation to which the system reacts). Although the apertures 89 on the movable grate 96 may be made smaller, the weight of the movable grate would be made heavier, which affects the speed and accuracy of control. Apertures 88 or 89 may also be made larger to accommodate higher flow rates, at the cost of loss of shutoff.

Figure 8:
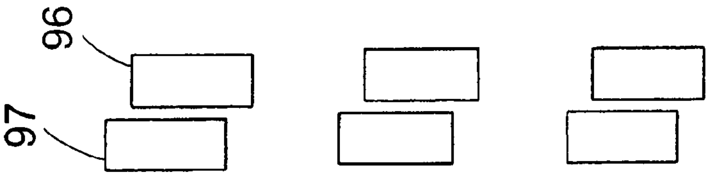
FIG. 8 shows the shape of a symmetric movable grate and fixed grate using slats.
Figure 7:
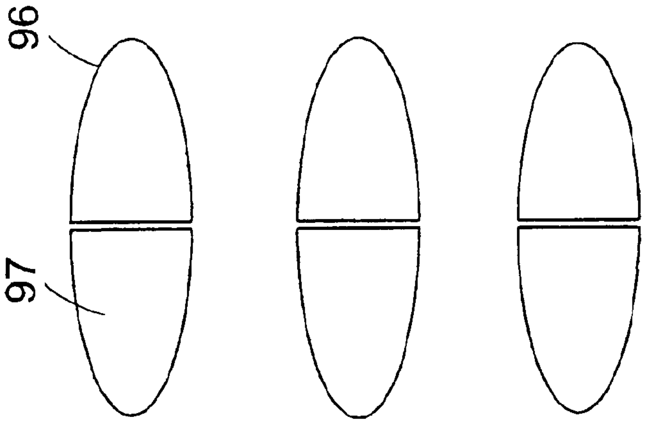
FIG. 7 shows the shape of a symmetric movable grate and fixed grate when aligned.

The fluid flow regulator of FIG. 2 may be used bidirectionally, especially if the shape of the movable grate 96 and the fixed grate 97, when aligned, is substantially symmetric fore and aft relative to the path of fluid flow, as shown in FIG. 7. In a preferred embodiment, the shape of the aligned grate 500 forms ellipses. Such a design provides for an efficient fluid flow due to the reduction of detachment of fluid associated with the ellipses. Other shapes, which are substantially symmetric fore and aft relative to the path of fluid flow, may similarly be used in a bidirectional manner. Shapes consisting of slats, may be used in other embodiments, as shown in FIG. 8. If the fore and aft shape of the fixed and movable grates is that of an airfoil, the fluid flow regulator may be used in only one direction efficiently, such that when the fluid flow is reversed the airfoil should also be reversed.

Figure 6C:
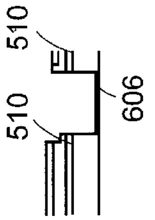
FIG. 6C shows an expanded view of a groove formed in the sheet of material in FIG. 6A.
Figure 6A:
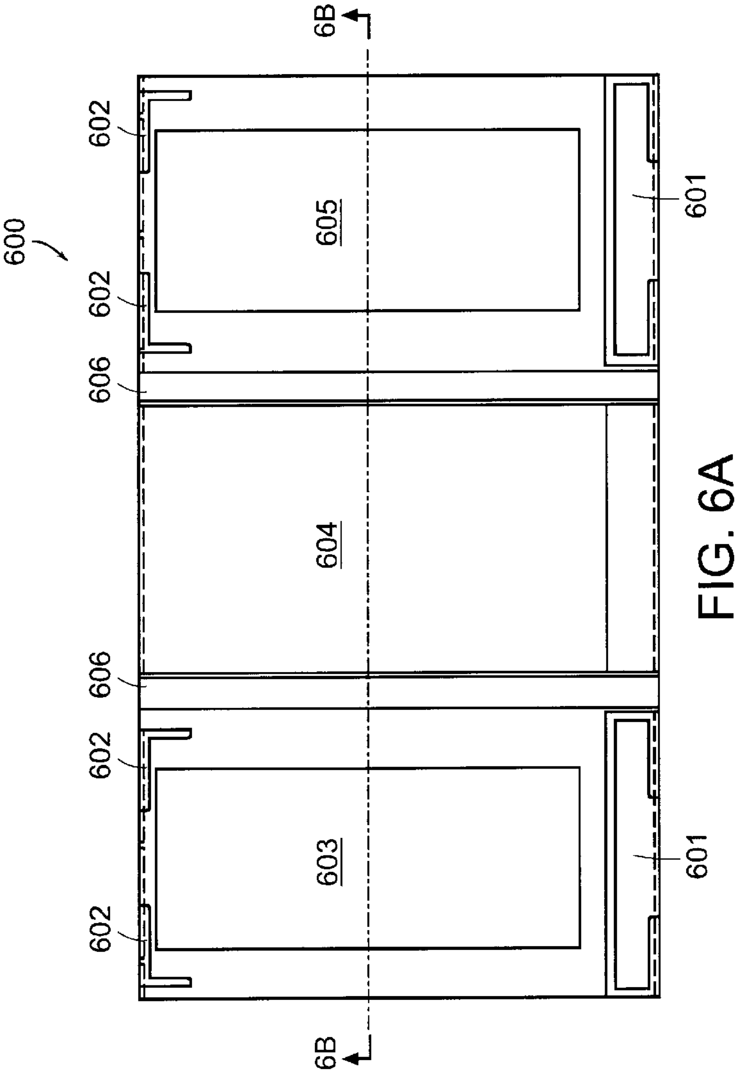
FIG. 6A shows a top-down layout for a single sheet of material that can be folded to make a shell for a flow regulator.
Figure 6B:
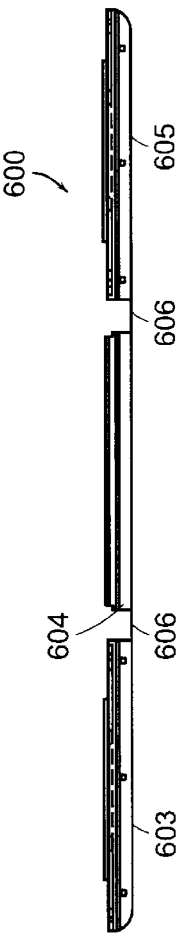
FIG. 6B shows a side view of the sheet of material in FIG. 6A across section A—A.

The shell 203 of the flow regulator shown in FIG. 2 is folded out of yet another single sheet of material. The shell 203 is a housing that encloses the entire regulator except for side 53, of plate 52. The shell also provides a top surface for forming reference chamber 74. FIGS. 6A–6B shows the shell prior to folding. FIG. 6A shows a top-down layout for material 600, while FIG. 6B shows a side view of material 600 across section A—A. Slots 602 are used for mounting the movable grate, while slots 601 are used to mount the fixed grate. Grooves 606 (an expanded view of a groove is shown in FIG. 6C), are formed by machining a substantially rectangular groove, so that the three sides of the shell can be folded into a three dimensional configuration. Additionally, the tolerances of the shell to the edges of the movable plates 52 and 55 are secured by flat machined surfaces along each of the four sides of sides 603 and 605 to assure uniform low leakage along the length of the flow regulator as defined by the axis of fluid flow.

FIGS. 4A, 5A, and 6A represent the components in their flattened state prior to assembly. The components of FIGS. 4A, 5A, and 6A may be created from flat sheets of a material, such as polypropylene. The polypropylene may be machined in a numerically or computer driven tool in a single set up using a single side process to form the requisite shapes including the integral hinges, tabs, slots, and cut outs. The two similarly formed sides of the shell 603 and 605 are folded to approximately ninety degrees relative to the machined side of 604. During that process, fixed grate 97 is mounted by inserting tabs 405 into slots 601. The movable grate assembly, with or without prior mounting of the balancing weight 201 is then mounted to the shell by inserting tabs 507 into slots 602. End caps 508 and 509 are then inserted into slots 510 of the shell to complete assembly of the flow regulator. Attached to the end cap 509 is a connection means to the region in which the partial differential pressure is to be maintained. End cap 508 is attached to either the supply or evacuation mechanism. In order to eliminate any unwanted gaps or volumes the assembly process may include, but is not limited to sealants, solvents, or welding processes, including for example, ultrasonic welding.

An additional benefit derived from machining polymer sheets in the above described manner is that all relevant physical dimensions of the components of the flow regulator are more accurate than can be achieved by other methods of assembly. Such achieved tolerances allow for less leakage, and provide for a more accurate operation of the regulator.

Figure 9:
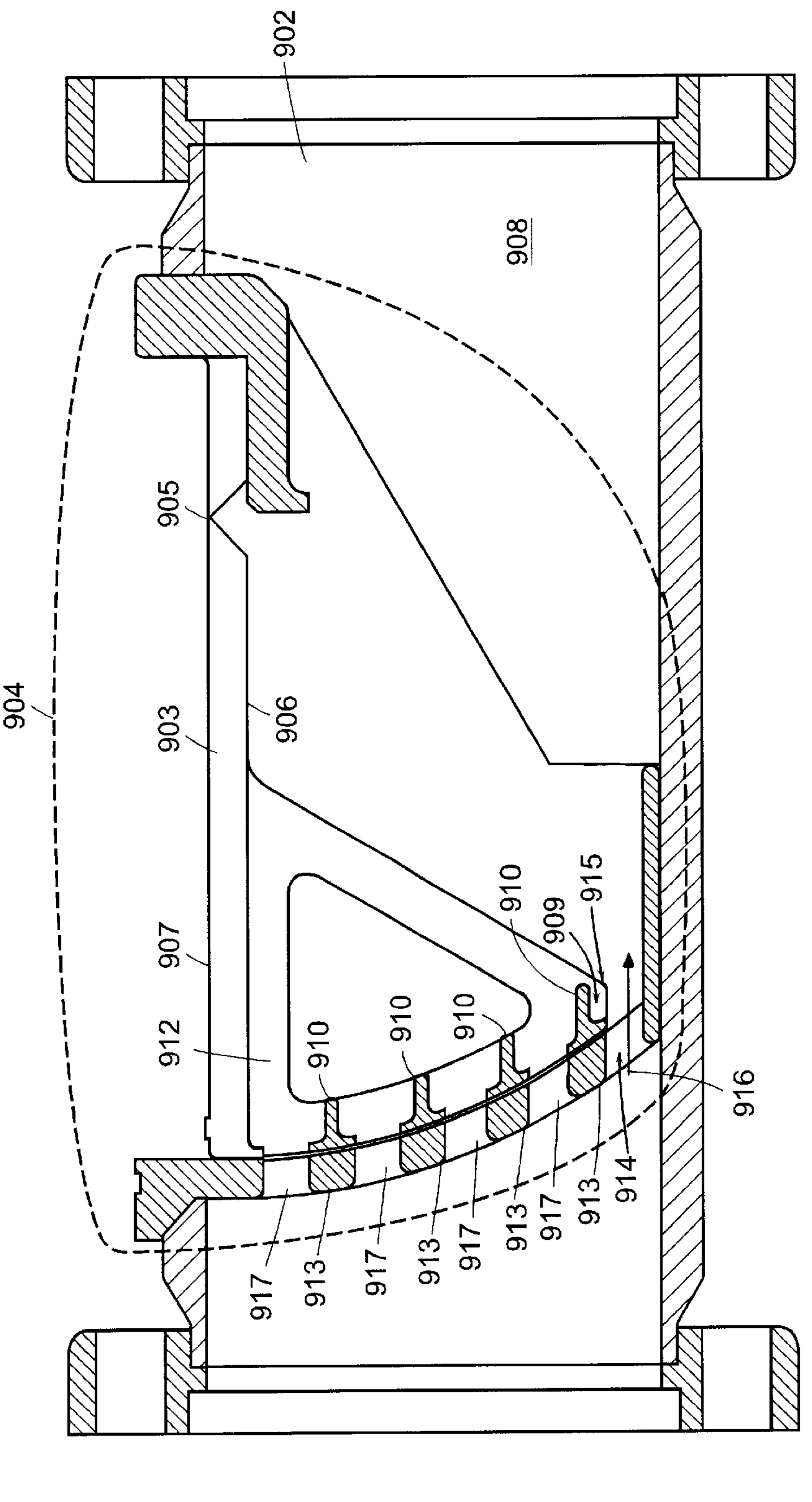
FIG. 9 shows a two-dimensional cross-section of a flow regulator that includes a single leaf-piston member.
Figure 10:
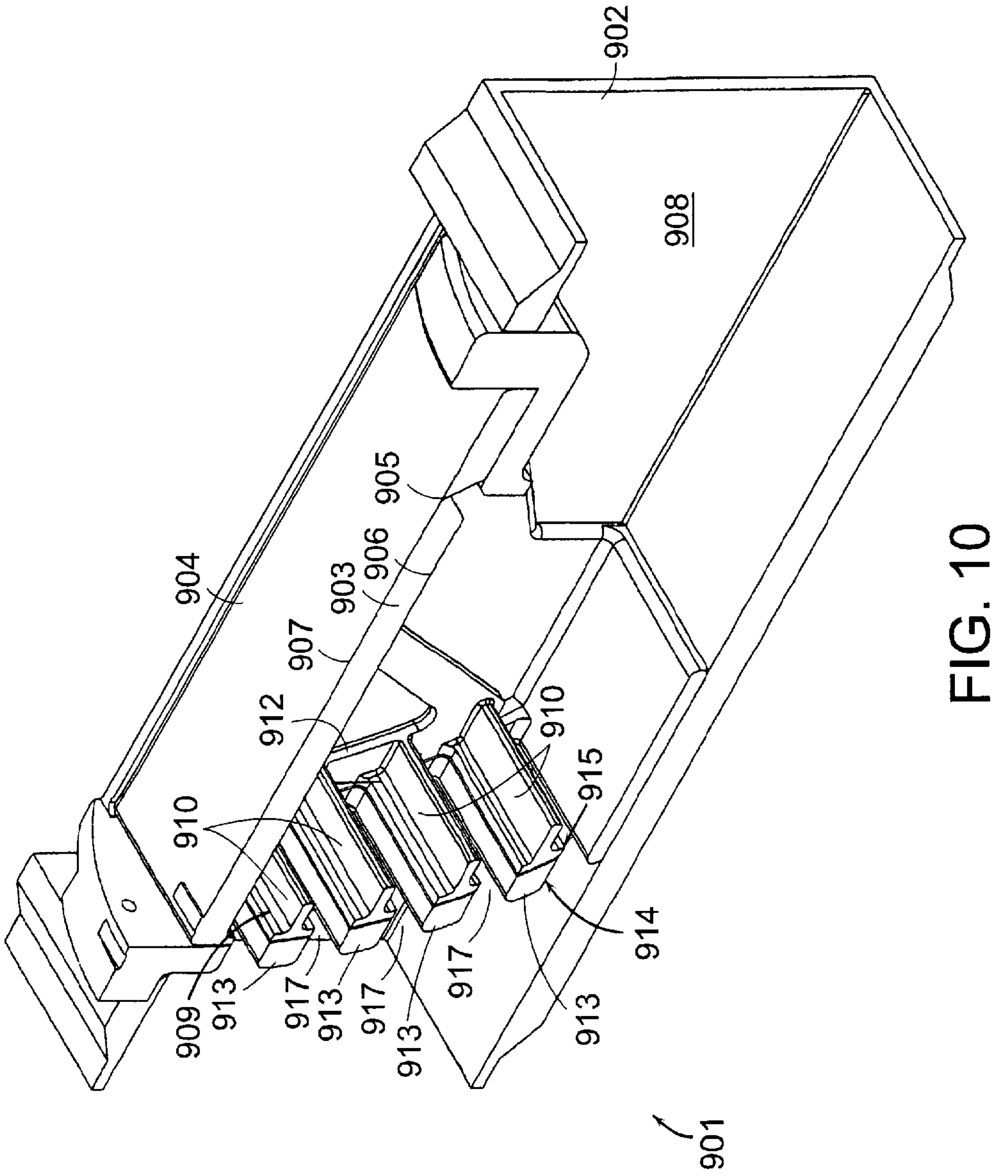
FIG. 10 shows a three-dimensional cross-section of the flow regulator shown in FIG. 9.

FIG. 9 is a two dimensional cross-section of a flow regulator 901 in accordance with another embodiment of the invention, while FIG. 10 shows a three dimension cross-section of the embodiment. Flow regulator 901 includes a cartridge 904 removably mounted to a conduit 902 through which fluid or gas flows. Cartridge 904 may, for example, slide into conduit 902, forming a slip fit. This arrangement allows for easy removal and maintenance of the cartridge and also permits access to the inside of the regulator 901 so that the regulator's insides can be cleaned. Conduit may be of various shapes, such as, but not limited to, rectangular or circular configurations.

A leaf-piston member 903 is attached to cartridge 904. The member 903 includes an integral hinge 905. Variations in the pressure differential between the frontal face 906 of member 903 and the distal face 907 of member 903 will tend to rotate the member 903 about the integral hinge 905. The distal face 907 is preferably exposed to ambient pressure and the regulator maintains a constant pressure differential between the ambient pressure (or another selected reference pressure) and the plenum 908.

The member 903 has a gate 909 attached to it. In the embodiment shown in FIG. 9, the gate 909 is a grate having a pair of arms 912 (only one is shown in the cross-section view of FIG. 9) extending downwardly and supporting the ends of crosspieces 910, which collectively form a movable grate 915. Each of the crosspieces 910 has immediately adjacent to it a corresponding crosspiece 913 which is connected to the sidewalls of the cartridge 904. The crosspieces 913 form a fixed grate 914, which cooperates with the movable grate 915 to form constriction points 917 through which the flow passes. Similar to above embodiments, when crosspieces 910 and 913 are aligned with each other, the passageway 916 through the grates is at its widest, and the grates provide the least impedance to flow. Alternatively, when the crosspieces 910 and 913 are not aligned, impedance increases, reaching a maximum when the crosspieces 910 and 913 do not overlap.

In another embodiment, an adjustable torque means is applied to member 903. Torque means may be calibrated, for example, to urge member 903 and gate 909 in an upwards position of least impedance when there is little or no flow through the regulator. Since the torque is adjustable, other set points may also be maintained. Torque means may be accomplished by, but not limited to, a spring, weight, DC electric motor, or the use of a piston and cylinder arrangement as may be found in a pneumatic or hydraulic control system.

Figure 11:
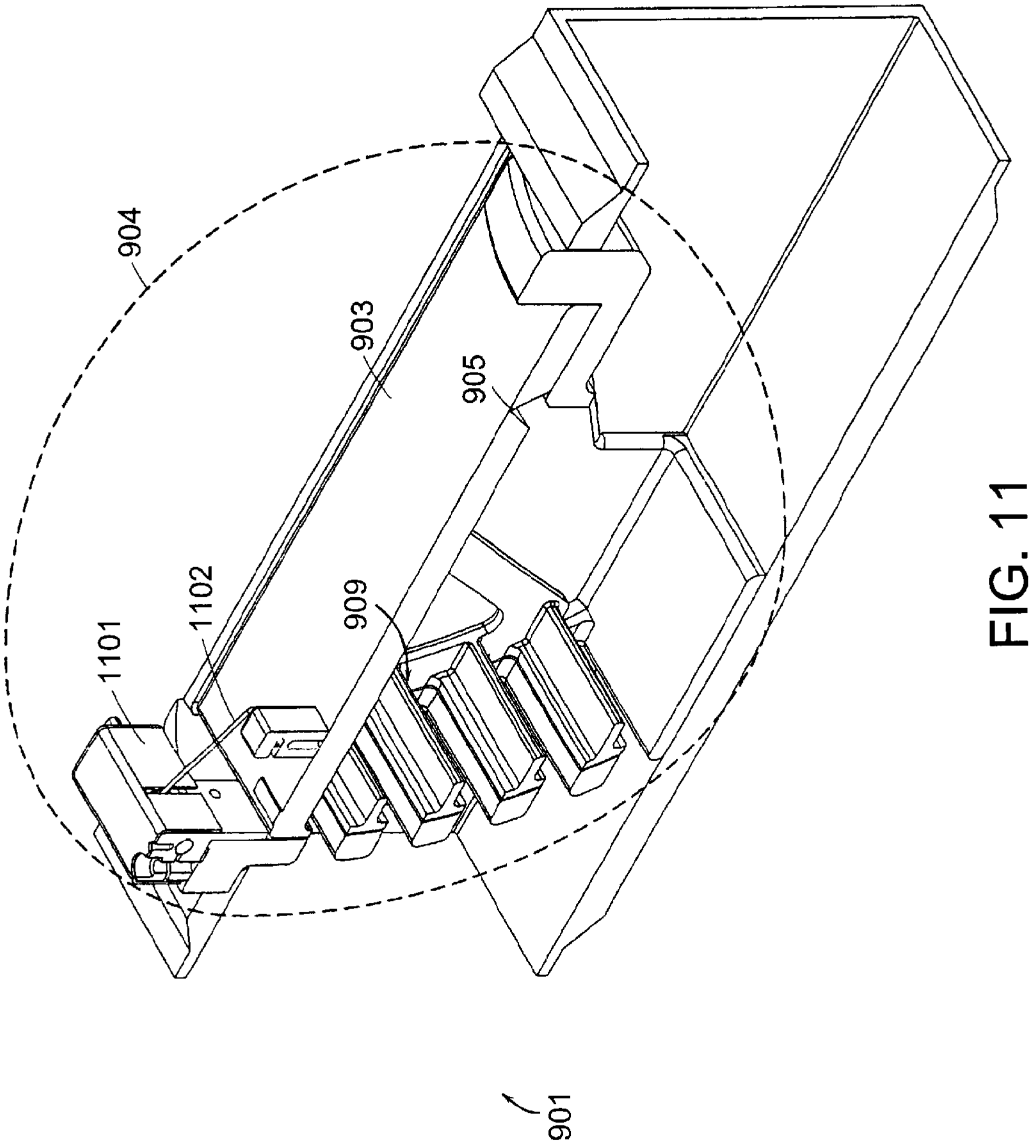
FIG. 11 shows a three-dimensional cross-section of the flow regulator shown in FIG. 10 that further includes an adjustor.

FIG. 11 is a three-dimensional cross-section of the flow regulator 901 shown in FIG. 10 that includes an adjustable torsional spring 1101 in accordance with one embodiment of the invention. Torsional spring 1101 is fixedly attached to the cartridge 904, while the arm 1102 of the torsional spring 1101 is connected to member 903 such that a torque is applied to member 903 about the integral hinge 905. The torque created is opposite of and equal to the balance of the torque applied by the flow through the gate 909 and the pressure on the rest of the member 903 to the left of the integral hinge 905. Thus, the member 903 has a stable equilibrium at a desired set point position that follows from the torque means.

Figure 12:
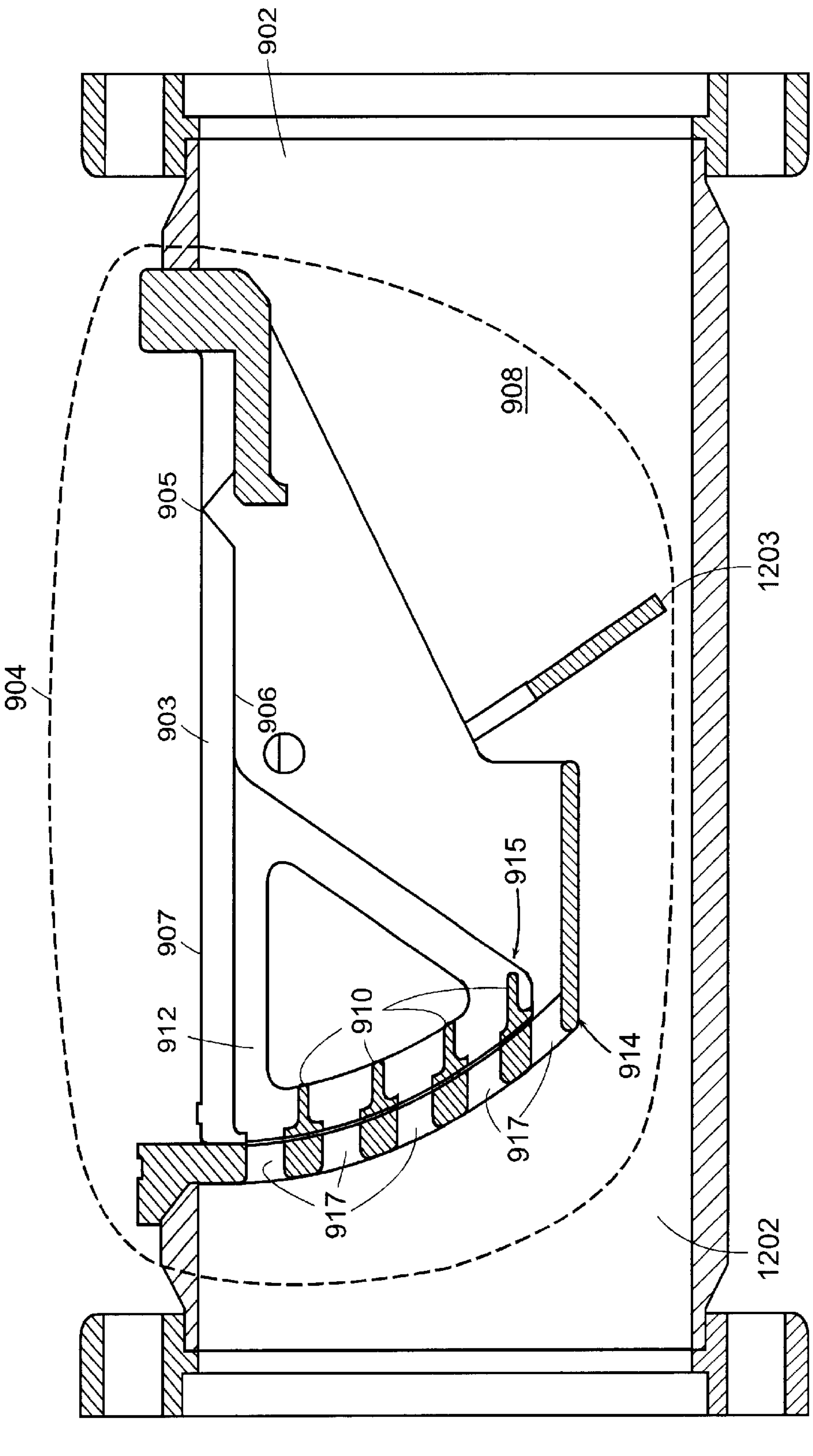
FIG. 12 shows a two-dimensional cross-section of the flow regulator shown in FIG. 9 that further includes a bypass channel.

The embodiments shown in FIGS. 9–11 may also include a bypass channel 1202, as shown in FIG. 12. The bypass channel 1202 permits some of the fluid flowing through the regulator 901 to bypass the constriction points 917 formed by the fixed 914 and movable 915 grates. An adjustable throttle 1203 may be attached to the fixed grate 914 to variably constrict the bypass channel 1202. By adjusting the throttle 1103 downwards, fluid flow through the bypass channel 1202 is decreased. By adjusting the throttle 1203 so that it closes the bypass channel 1202, the regulator 1201 can be made to function like the non-bypass regulator shown in FIGS. 9 and 10. Alternatively, adjusting the throttle 1203 upwards increases the fluid through the bypass channel 1202. This allows the desired plenum pressure to be reached at higher flow levels than the regulator shown in FIGS. 9 and 10.

In one embodiment, one assembled flow regulator has been shown to maintain a pressure differential [between the reference pressure (typically ambient depending on application) and the control set point pressure] of 0.05 inches of water column with a low flow rate of approximately 7 cubic feet of air or other fluid per minute, independent of the supply pressure and independent of the fluctuations of the reference pressure(s).

By utilizing components having integral hinges instead of pin in hole hinges, various advantages over previous fluid flow regulators can be realized. These advantages include, but are not limited, to the following. The number of individual components making up the device is reduced, making the manufacturing process more cost effective. Additionally, the integral hinges and other components can be made from plastics, polymers, elastomers, and other materials exhibiting long life flexing behavior, reducing manufacturing complexity and resulting in additional cost savings. Furthermore, the long term reliability and accuracy of relative motion of integral plastic hinges is greater than pin and hole hinges, improving the life span of the product. Integral hinges also are not susceptible to dirt or dust, and equally as important, they do not produce dirt or dust from their wear and tear, which is significant for sterile and clean environments. All these benefits are achieved without sacrificing operability of the regulator in terms of the pressure differential that can be maintained.

The present invention may be embodied in other specific forms without departing from the true scope of the invention. The described embodiments are to be considered in all respects only as illustrative and not restrictive.

What is claimed is:

1. A system for regulating the flow of gas from an environment, through a region and to a lower pressure area, so as to maintain a constant differential pressure in the region with respect to the environment, the system comprising:

a path, through which gas passes from the region to the lower pressure area;

a reference chamber located adjacent the path;

first and second plates mounted at opposite sides of the path so that the two plates are substantially parallel to each other, the first plate being of unitary construction and having a first fixed portion and a first movable portion, the first fixed portion being fixed to a frame defining the path and being connected to the first movable portion by a first integral hinge of the first plate so that the first movable portion can rotate at the first integral hinge relative to the first fixed portion, the second plate being of unitary construction and having a second fixed portion and a second movable portion, the second fixed portion being fixed to the frame and connected to the second movable portion by a second integral hinge of the second plate so that the second movable portion can rotate at the second integral hinge relative to the second fixed portion, both the first plate and the second plate having a conduit side, facing the path, and a reference-pressure side, the second plate's reference-pressure side being exposed to the environment's pressure, and the first plate's reference-pressure side being exposed to the reference chamber, a reference conduit connecting the region directly to the reference chamber so that the pressure in the reference chamber is the same as the region's pressure; and an impeder for variably impeding the flow through the path based on the position of the plates.

2. A system according to claim 1, wherein the impeder includes a fixed grate disposed in the path so that it does not move with respect to the path, and a movable grate, the movable grate coupled to the first plate via a third integral hinge at a point distal from the first integral hinge, the movable grate coupled to the second plate via a fourth integral hinge at a point distal from the second integral hinge, the movable grate being disposed immediately adjacent to the fixed grate, so that as the movable grate moves with respect to the fixed grate the impedance on the flow varies.

3. A system according to claim 2, wherein the movable grate, the first plate, and the second plate are a single component formed from a single sheet of a material.

4. A system according to claim 3, wherein the material is polypropene.

5. A system according to claim 2, wherein the fixed grate is formed from a single sheet of a material.

6. A system according to claim 5 wherein the material is polypropene.

7. A system according to claim 2, wherein the movable grate and the fixed grate, when aligned, have a shape that is substantially symmetric fore and aft relative to the path.

8. A system according to claim 7, wherein the shape is elliptical.

9. A system according to claim 1, further comprising an adjuster for urging the plates to move in a direction that adjusts the impedance on the flow.

10. A system according to claim 9, wherein the adjuster includes one of a spring, a weight, a DC electric motor, or a piston and cylinder arrangement.

11. A system according to claim 10, wherein the spring is one of a compression spring or a torsional spring.

12. A system for regulating fluid flow, the device comprising:

a path through which fluid flows;

first and second plates mounted at opposite sides of the path so that the two plates are substantially parallel to each other, the first plate having unitary construction with a first integral hinge so that the first plate can rotate at the first integral hinge, the second plate having unitary construction with a second integral hinge so that the second plate can rotate at the second integral hinge, both the first plate and the second plate having a conduit side, facing the path, and a reference-pressure side, the first plate's reference-pressure side being exposed to a first reference pressure, and the second plate's reference-pressure side being exposed to a second reference pressure; and impedance means attached to the plates for variably impeding the flow through the path based on the position of the plates wherein the impeder includes a fixed grate disposed in the path so that it does not move with respect to the path, and a movable grate, the movable grate coupled to the first plate via a third integral hinge of the first plate at a point distal from the first integral hinge, the movable grate coupled to the second plate via a fourth integral hinge of the second plate at a point distal from the second integral hinge, the movable grate being disposed immediately adjacent to the fixed grate, so that as the movable grate moves with respect to the fixed grate the impedance on the flow varies.

13. A system according to claim 12, wherein the movable grate, the first plate, and the second plate are a single component formed from a single sheet of a material.

14. A system according to claim 13, wherein the material is polypropene.

15. A system according to claim 12, wherein the fixed grate is formed from a single sheet of a material.

16. A system according to claim 15, wherein the material is polypropene.

17. A system according to claim 12, wherein the movable grate and the fixed grate, when aligned, have a shape that is substantially symmetric fore and aft relative to the path.

18. A system according to claim 17, wherein the shape is elliptical.

19. A system according to claim 12, further comprising restoring means for urging the plates to move in a direction that lessens the impedance on the flow.

20. A system according to claim 19, wherein the restoring means includes one of a spring, a weight, a DC electric motor, or a piston and cylinder arrangement.

21. A system according to claim 20, wherein the spring is one of a compression spring or a torsional spring.

22. A system for regulating fluid flow, the system comprising:

- a path through which fluid passes;
- a plate of unitary construction and having a first integral hinge hinging the first plate to a fixed member relative to the path so that the plate can rotate at the first hinge, the plate having a reference-pressure side, the plate's reference pressure side being exposed to a reference pressure;
- a fixed grate disposed in the path so that it does not move with respect to the path; and
- a movable grate coupled to the plate via a second integral hinge of the plate at a point distal from the first integral hinge, the movable grate being disposed immediately adjacent to the fixed gate, so that the movable and fixed grates impart an impedance to the flow through the path, and so that, as the movable grate moves with respect to the fixed grate, the impedance on the flow varies.

23. A system according to claim 22, wherein the movable grate and the fixed grate, when aligned, have a shape that is substantially symmetric fore and aft relative to the path.

24. A system according to claim 23, wherein the shape is elliptical.

25. A system according to claim 22, further including restoring means for applying a torque about the first integral hinge that urges the plate in a direction that lessens the impedance.

26. A system according to claim 25, wherein the restoring means includes one of a spring, a weight, a DC electric motor, or a piston and cylinder arrangement.

27. A system according to claim 26, wherein the spring is one of a compression spring or a torsional spring.

28. A device for regulating the flow of fluid through a passageway, the device comprising:

- a conduit having a wall defining the passageway through the device;
- a member of unitary construction having a top face, exposed to a reference pressure, and a bottom face forming a portion of the conduit wall, the member having a fixed section fixed to the conduit, and a movable section hinged to the fixed section by an integral hinge of the member so that the movable section can rotate at the first integral hinge; and
- a gate, attached to the member at a point distal from the first integral hinge, the gate extending into the passageway so as to variably impede fluid flowing through the passageway at a constriction point, the gate's impedance on the fluid flow varying as a function of the pressure differential across the member's top and bottom faces, the gate and the member being mounted so that each moves in a direction transverse to the direction of the fluid through the constriction point.

29. A device according to claim 28, wherein the gate includes a movable grate fixedly attached to the member so that it moves with the member, and wherein the conduit includes a fixed grate fixedly attached to the conduit so that the fixed grate does not move with respect to the conduit, the fixed grate and movable grate being located adjacent each other and defining a plurality of constriction points, the size of each constriction point varying as the member moves.

30. A device according to claim 29, wherein the movable grate and the fixed grate, when aligned, have a shape that is substantially symmetric fore and aft relative to the passageway.

31. A system according to claim 30, wherein the shape is elliptical.

32. A system according to claim 28, further comprising restoring means for exerting a torque on the member about the first integral hinge so as to tend to cause the gate to lessen the impedance on the fluid flow, and so that when there is no fluid flow through the passageway the amount that the gate impedes the flow is relatively low, the restoring means including the weight of the member upstream of the pivot point.

33. A system according to claim 32, wherein the restoring means includes one of a spring, a weight, a DC electric motor, or a piston and cylinder arrangement.

34. A system according to claim 33, wherein the spring is one of a compression spring or a torsional spring.

35. A device for regulating the flow of fluid, the device comprising:

- a conduit through which fluid flows;
- a member of unitary construction having a frontal face along which the entire face fluid in the conduit flows, and a distal face exposed to a reference pressure, the member having a fixed section fixed to the conduit, and a movable section hinged to the fixed section by an integral hinge of the member so that the movable section can rotate at the integral hinge; and
- impedance means for variably impeding flow through the conduit at one or more constriction points, the size of each constriction point varying as the member moves, the impedance means extending only part way into the passageway, so that a portion of the flow through the passageway bypasses the constriction point.

36. A device according to claim 35, wherein the impedance means includes a movable grate fixedly attached to the member so that it moves with the member, and wherein the conduit includes a fixed grate fixedly attached to the conduit so that the fixed grate does not move with respect to the conduit, the fixed grate and movable grate being located adjacent each other, and defining the one or more constriction points, the size of each constriction point varying as the member moves.

37. A device according to claim 36, wherein the movable grate and the fixed grate, when aligned, have a shape that is substantially symmetric fore and aft with respect to the path.

38. A system according to claim 37, wherein the shape is elliptical.

39. A system according to claim 35, further comprising restoring means for exerting a torque on the member about the hinge, so as to tend to lessen the impedance on the fluid flow, and so that when there is no flow through the conduit the impedance caused by the impedance means is relatively low.

40. A system according to claim 39, wherein the restoring means includes one of a spring, a weight, a DC electric motor, or a piston and cylinder arrangement.

41. A system according to claim 40, wherein the spring is one of a compression spring or a torsional spring.

42. A device for regulating fluid flow, the device comprising:

a shell formed from a single sheet of folded material, the shell forming a path through which fluid flows;

a fixed grate formed from a single sheet of folded material, the fixed grate disposed in the path so that as fluid moves the fixed grate does not move; and a movable grate component of unitary construction formed from a single sheet of folded material, the movable grate component including a movable grate that moves with respect to the fixed grate so as to vary flow impedance, wherein the movable grate component is fixedly mounted to the shell.

43. A device to claim 42, wherein the movable grate assembly includes at least one member that includes an integral hinge, such that the member can rotate at the integral hinge.

44. A device according to claim 43 wherein the integral hinge is formed by one of injection molding, hot forging, or machining of oriented material.

45. A device according to claim 42, wherein the movable grate assembly further includes first and second plates, the first plate having a first integral hinge so that the first plate can rotate at the first integral hinge, the second plate have a second integral hinge so that the second plate can rotate at the second integral hinge, the movable grate coupled to the first plate via a third integral hinge at a point distal from the first integral hinge, the movable grate coupled to the second plate via a fourth integral hinge at a point distal from the second integral hinge, the first and second plates mounted at opposite sides of the path such that both plates having a conduit side, facing the path, and a reference-pressure side being exposed to a first reference pressure.

46. A method for constructing a device for regulating fluid flow, the method comprising:

folding a first sheet of material forming a shell;

folding a second sheet of material forming a fixed grate;

folding a third sheet of material forming a movable grate with at least one intagral hinge, combining the shell, the fixed grate, and the movable grate to form the device.

47. A method according to claim 46, further comprising applying a sealant to seal the device.

48. A method for constructing a device for regulating fluid flow, the method comprising:

folding a first sheet of material forming a shell;

folding a second sheet of material forming a fixed grate;

folding a third sheet of material forming a movable grate with at least one internal hinge, combining the shell, the fixed grate, and the movable grate to form the device, further comprising using a welding process to seal the device.

49. A method for constructing a device for regulating fluid flow, the method comprising:

folding a first sheet of material forming a shell;

folding a second sheet of material forming a fixed grate;

folding a third sheet of material forming a movable grate with at least one internal hinge, combining the shell, the fixed grate, and the movable grate to form the device, further comprising using ultrasonic welding to seal the device.

50. A device according to claim 46, wherein the movable grate assembly includes at least one member that has an integral hinge, such that the member can rotate at the integral hinge.

51. A device for regulating the flow of gas from an environment, the device comprising:

a shell forming a path through which fluid flows;

a fixed grate disposed in the path so that as fluid flows in the path the fixed grate does not move; and a movable grate component of unitary construction that includes one or more plates, fixedly attaching the movable grate component to the shell, and a movable grate attached to the one or more plates, the one or more plates including an integral hinge such that the plate can rotate about the integral hinge, wherein when the movable grate moves with respect to the fixed grate the impedance on the flow varies.

52. A device according to claim 51, wherein the one or more plates are attached to the shell.

53. A device according to claim 51, wherein the movable grate is attached to each plate via an integral hinge.

54. A device according to claim 51, wherein the movable grate assembly is formed from a single sheet of folded material.

55. A device according to claim 51, wherein the shell is formed from a single sheet of folded material.

56. A device according to claim 51, wherein the fixed grate is formed from a single sheet of folded material.

57. A device according to claim 51, further including an adjuster for urging the plates to move in a direction that adjusts the impedance on the flow.

58. A device according to claim 57, wherein the adjuster includes one of a spring, a weight, a DC electric motor, or a piston cylinder arrangement.

59. A device according to claim 58, wherein the spring is one of a compression spring or a torsional spring.

60. The device according to claim 59, wherein the movable grate and the fixed grate, when aligned, have a shape that is substantially synunetric fore and aft relative to the path.

61. The device according to claim 60, wherein the shape is elliptical.

62. A device according to claim 51, wherein the movable grate assembly includes first and second plates, the first plate having a first integral hinge so that the first plate can rotate at the first integral hinge, the second plate have a second integral hinge so that the second plate can rotate at the second integral hinge, the movable grate coupled to the first plate via a third integral hinge at a point distal from the first integral hinge, the movable grate coupled to the second plate via a fourth integral hinge at a point distal from the second integral hinge, the first and second plates mounted at opposite sides of the path such that both plates having a conduit side, facing the path, and a reference-pressure side being exposed to a first reference pressure.

* * * * *